United States Patent [19]

Branstad et al.

[11] Patent Number: 5,537,408
[45] Date of Patent: Jul. 16, 1996

[54] APPARATUS AND METHOD FOR SEGMENTATION AND TIME SYNCHRONIZATION OF THE TRANSMISSION OF MULTIMEDIA DATA

[75] Inventors: Mark W. Branstad; Jonathan W. Byrn; Gary S. Delp; Phillip L. Leichty, all of Rochester, Minn.; Jeffrey J. Lynch, Apex, N.C.; Kevin G. Plotz, Byron, Minn.; Lee A. Sendelbach, Rochester, Minn.; Albert A. Slane, Oronoco, Minn.

[73] Assignee: International Business Machines Corporation, Armonk, N.Y.

[21] Appl. No.: 463,207

[22] Filed: Jun. 5, 1995

Related U.S. Application Data

[63] Continuation of Ser. No. 382,905, Feb. 3, 1995.

[51] Int. Cl.$^6$ ...................................................... H04N 5/04
[52] U.S. Cl. ..................... 370/79; 370/94.2; 370/100.1; 348/518
[58] Field of Search ................................ 370/60, 60.1, 79, 370/85.6, 94.1, 94.2, 100.1, 108; 379/93, 94, 96; 348/13, 17, 461, 464, 467, 473, 500, 512, 518

[56] References Cited

U.S. PATENT DOCUMENTS

| | | | |
|---|---|---|---|
| 5,138,440 | 8/1992 | Radice ...................................... | 358/13 |
| 5,255,291 | 10/1993 | Holden et al. .......................... | 375/111 |
| 5,260,942 | 11/1993 | Auerbach et al. ...................... | 370/94.1 |
| 5,287,182 | 2/1994 | Haskell et al. ........................... | 348/500 |
| 5,381,181 | 1/1995 | Deiss ....................................... | 348/423 |
| 5,398,072 | 3/1995 | Auld ........................................ | 348/426 |

OTHER PUBLICATIONS

ATM Network Planning and Evolution, R1022 Technical Commitee Workshop, London 16/17 Apr. 1991, "A Cell Spacing and Policing Device For Multiple Virtual Connections On One ATM Pipe" Wallmeier et. al.

IEEE INFOCOM '95, Proceedings, Vol. 1, "Multiplexing Spacer Outputs On Cell Emissions," Apr. 1995, Mercankosk et al., pp. 49–55.

"ATM Cell Scheduler," U.S. Patent Serial No. 08/332,160 filed Oct. 31, 1994.

ATM Forum Technical Committee Jeff Lynch & Levent Gun, Nov. 29–Dec. 2, 1994, "Encapsulating MPEG-2 TS Packets Into AAL5PDUs".

ATM Forum Technical Committee, Jeff Lynch, Steve Vanderlinden, Subir Varma, Sep. 26–29, 1994, "QOS Considerations in a Push Server Environment".

IBM Technical Disclosure Bulletin, "Optimized Data time Stamps for Digital Audio and Video on a Stochastic Network," vol. 36, No. 09A Sep. 1993.

"ATM Forum AMS Status," Doc. AVC–738, ITU–T Telecommunication Standardization Sector—January 1995.

ATM Forum Technical Committee, Zhang, Perkins, Goldman, Long, Szot, Izzard, Buckland and Dixit, Sep. 26–30, 1994, "Carrying MPEG-2 Transport Streams Using AAL-5".

ATM Forum Technical Committee, Surya Varanasi and Raymond Hsu, Sep. 26–30, 1994, "MPEG-2 Over ATM for CBR AMS Applications".

*Primary Examiner*—Douglas W. Olms
*Assistant Examiner*—Russell W. Blum
*Attorney, Agent, or Firm*—Joan Pennington

[57] ABSTRACT

Method and apparatus are provided for transmitting a stream of multimedia digital data over a distribution communications network. A multimedia stream server segments the multimedia digital data stream into data blocks on a first boundary and a second boundary. The first boundary is a set number of transport system data packets and the second boundary is a transport system data packet including a timestamp. A scheduler schedules the segmented data blocks for transmission. The multimedia stream server decodes the segmented data blocks to locate the timestamps and matches the transmission of the located timestamp data block with a time value indicated by the timestamp. The set number of transport system data packets can be determined at connection setup and is not a predetermined value for all sessions. At the receiver, batch processing of received multimedia data can be provided.

5 Claims, 14 Drawing Sheets

APPARATUS AND METHOD FOR SEGMENTATION AND TIME SYNCHRONIZATION OF THE TRANSMISSION OF MULTIMEDIA DATA

This is a continuing application of application Ser. No. 08/382,905, filed Feb. 3, 1995, pending.

FIELD OF THE INVENTION

The present invention relates to a method and apparatus for segmenting and timing the transmission of a stream of multimedia digital data over a distribution communications network.

DESCRIPTION OF THE PRIOR ART

Multimedia communications involve the blending together of computer data processing, audio/video, and display technology in an interactive environment. Evolving multimedia applications such as desktop computer conferencing and video-on-demand bring with them the need for network access to shared or common real-time data. The "real-time" aspect of data can be defined as the characteristic of data which must be delivered on-time, that is, late and early delivery of data are both useless.

A Moving Pictures Experts Group MPEG-2 standard for multimedia stream transport is described in "MPEG-2" International Organization for Standardization; Organization Internationale De Normalisation (ISO/IEC ITC1/SC29/WG11) Coding of Moving Pictures and Associated Audio. The MPEG-2 standard has defined a system layer that integrates multiple media sources into a single data stream with integrated time stamps (PCRs). The MPEG-2 standard has defined a fixed and variable rate encoding scheme for video streams that allows for variable size and quality of video streams. The MPEG-2 standard has defined a transport mechanism for other video encoding schemes, for example, MPEG-1. The MPEG-2 multimedia stream is transported over a digital network which uses the ITU standards commonly referred to as Asynchronous Transfer Mode (ATM). The Asynchronous Transfer Mode (ATM) network described in "Asynchronous Transfer Mode: Solution for Broadband ISDN", M de Prycker, Ellis Horwood, 1991 is an internationally agreed upon technique for transmission, multiplexing and switching in a broadband network. It uses fixed size cells as a unit of transmission.

ATM networks are designed to support the integration of high quality voice, video, and high speed data traffic. To the end-user, it promises to provide the ability to transport connection-oriented and connectionless traffic at constant or variable bit rates. It allows for allocation of bandwidth on demand and intends to provide negotiated Quality-of-Service (QOS). To a network provider, it enables the transport of different traffic types through the same network. In order for a network to meet QOS requirements as set by the user for a session, the network must have sufficient information about the traffic characteristics of the session. This may be approximated by (but not limited to) three basic parameters: 1) average transmission rate, 2) peak transmission rate, and 3) the interval over which the data may be transmitted at peak rate. As a part of the QOS contract with the network, all sessions must abide by the traffic parameters and not violate these parameters in order for the network to guarantee QOS to all the users. This gives rise to a complex scheduling problem when many sessions are established over a network link, which requires that each session's contract with the network not be violated. At the same time, all sessions must get the desired capacity from the network. This problem is fairly complex particularly when it involves a large number of sessions with a wide range of traffic descriptors. The problem is further compounded with the fact that different sessions require different QOS. Therefore, in case of contention, where a multiplicity of sessions have data to be transmitted and their individual contracts with the network will allow them to transmit, sessions requiring stricter QOS guarantee must be given priority over other sessions.

Important aspects of data delivery include time-synchronization, bandwidth or throughput and latency. The MPEG-2 transport stream is a series of 188 byte packets which must be delivered to the receiver for decoding. At least one 188 byte packet every 100 milliseconds includes the time stamp or program clock reference (PCR). The time stamps need to arrive at the receiver with a minimum of jitter introduced by the server transmitter. Improved transmission efficiency is provided when at least two Transport Stream (TS) 188-byte packets are sent per frame of data over the ATM network. The MPEG-2 layer provides data to the transport layer. With ATM AAL-5 (ATM Adaptation Layer for simple and efficient transport of frame traffic), each ATM cell carries 48 bytes. In each frame, framing data of 8 bytes must be carried in the last cell of the AAL-5 frame. With one TS 188-byte packet per frame, the frame includes 196 bytes and requires 5 ATM cells with 44 bytes of padding providing a transport efficiency of about 70.9%. With two TS 188-byte packets per frame, the frame includes 384 bytes and requires 8 ATM cells providing a transport efficiency of about 88.6%. With three through thirteen TS 188-byte packets per frame, the frame includes 572–2452 bytes and requires 12–52 ATM cells providing a transport efficiency of about 88.6%. Fourteen through seventeen TS 188-byte packets per frame provide a transport efficiency above 90%.

The time stamps need to arrive at the receiver with a minimum of jitter introduced by the network server transmitter. To reduce the jitter of the clock recovery at the receiver, a requirement has been established that any MPEG-2 188 byte packet that contains a time stamp (PCR) must terminate the AAL-5 frame. Because PCRs can occur in any frame, if more than one MPEG-2 packets are normally bundled, the bundling may be variable. When the bundling is variable, even a fixed rate multi-media stream becomes variable rate. That means that the task of transmitting MPEG-2 frames in an isochronous mode becomes a challenge. In addition to the problem for transmitter to transmit with minimum jitter in the PCRs to make the receive clock recovery simple and robust, a need exists to reduce the computational overhead of providing the stream.

Processing overhead for traffic effects both transmitter and receiver. Processing overhead can in a simplified form be given by A * number of frames + B * number of bytes. In many cases, the factor A is 500–10000 times greater than the factor B. This means that in environments where processing power is limited, the frames should be as big as possible.

SUMMARY OF THE INVENTION

Important objects of the present invention are to provide an improved method for segmenting and time synchronization of the transmission of a stream of multimedia digital data over a distribution communications network.

In brief, the objects and advantages of the invention are achieved by a method and apparatus for transmitting a stream of multimedia digital data over a distribution communications network. The multimedia stream server segments the multimedia digital data stream into data blocks on a first boundary and a second boundary. The first boundary is a set number of transport system data packets and the second boundary is a transport system data packet including a timestamp. A scheduler schedules the segmented data blocks for transmission. The multimedia stream server decodes the segmented data blocks to locate the timestamps and matches the transmission of the located timestamp data block with a time value indicated by the timestamp. The set number of transport system data packets can be determined at connection setup and is not a predetermined value for all sessions. At the receiver, batch processing of received multimedia data can be provided.

BRIEF DESCRIPTION OF THE DRAWING

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
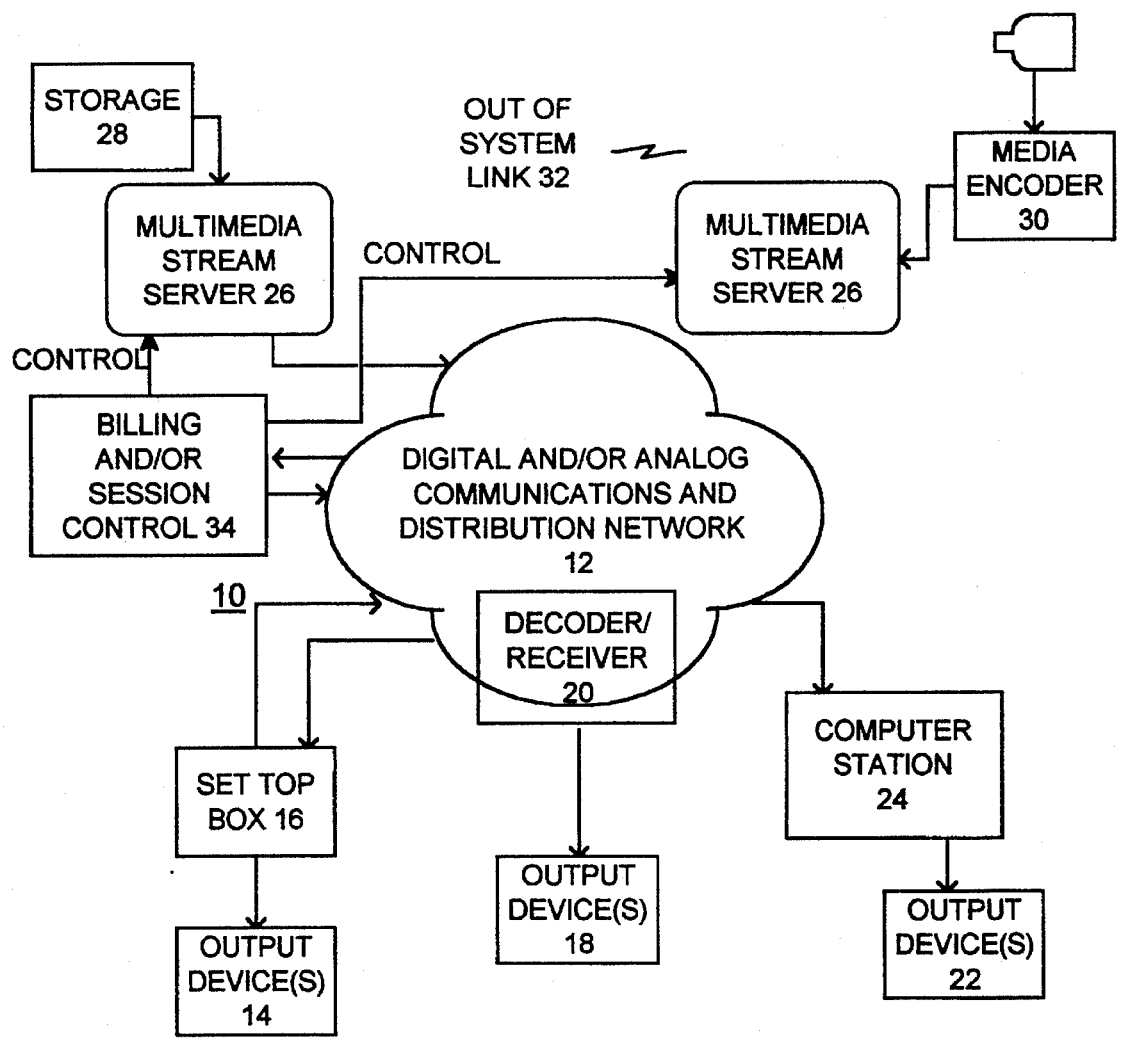
FIG. 1 is a block diagram representation illustrating a digital video-on-demand system of the type used with the apparatus and method for segmenting and timing the transmission of a stream of multimedia digital data in accordance with the present invention.

Having reference now to the drawings, in FIG. 1 there is shown a block diagram representation of a video-on-demand multimedia distribution system generally designated by the reference character 10 which may be employed to implement the method of the present invention. The multimedia distribution system 10 includes a digital/analog communications and distribution network 12 that is capable of interconnecting all of the other elements of the system. Network 12 may have digital and analog components and may carry different communication flows with the same or different transport mechanisms. The multimedia distribution system 10 includes a client function or customer interface represented by a first output device or devices 14, an associated set top box 16; a second output device or devices 18, an associated decoder/receiver 20 and a third output device or devices and an associated computer station 24.

Content is selected at the client function and display/presentation of the multimedia stream occurs at the client. When the output device 14 is implemented with a television set, the set top box 16 or the box on top of the television set 14 acts as a converter from the network to the television and the active conversion is embodied in the set top box. The receiver of digital data may be at the set top box 16 or may be embedded in the communications network as illustrated with the decoder/receiver 20 used with output device or devices 18. For other multimedia applications, the digital data is received by computer station 24 and presented with output device or devices 22. A multimedia stream server 26 takes media streams from a storage device 28, a media encoder 30, or from an out-of-network source or link 32, and injects these streams into the distribution network 12 with the appropriate format and timing in accordance with features of the invention. Features of the invention for providing the stream of digital data into a distribution system 10 with the appropriate format and timing can be implemented by the multimedia server function 26.

A billing and/or session control function 34 is responsible for communicating with the client systems, connecting clients to servers, and whatever billing and scheduling as needed. The control function 34 provides control signals via lines labelled CONTROL to the multimedia steam servers 26. The control function 34 can be a distributed or centralized implementation.

Figure 2:
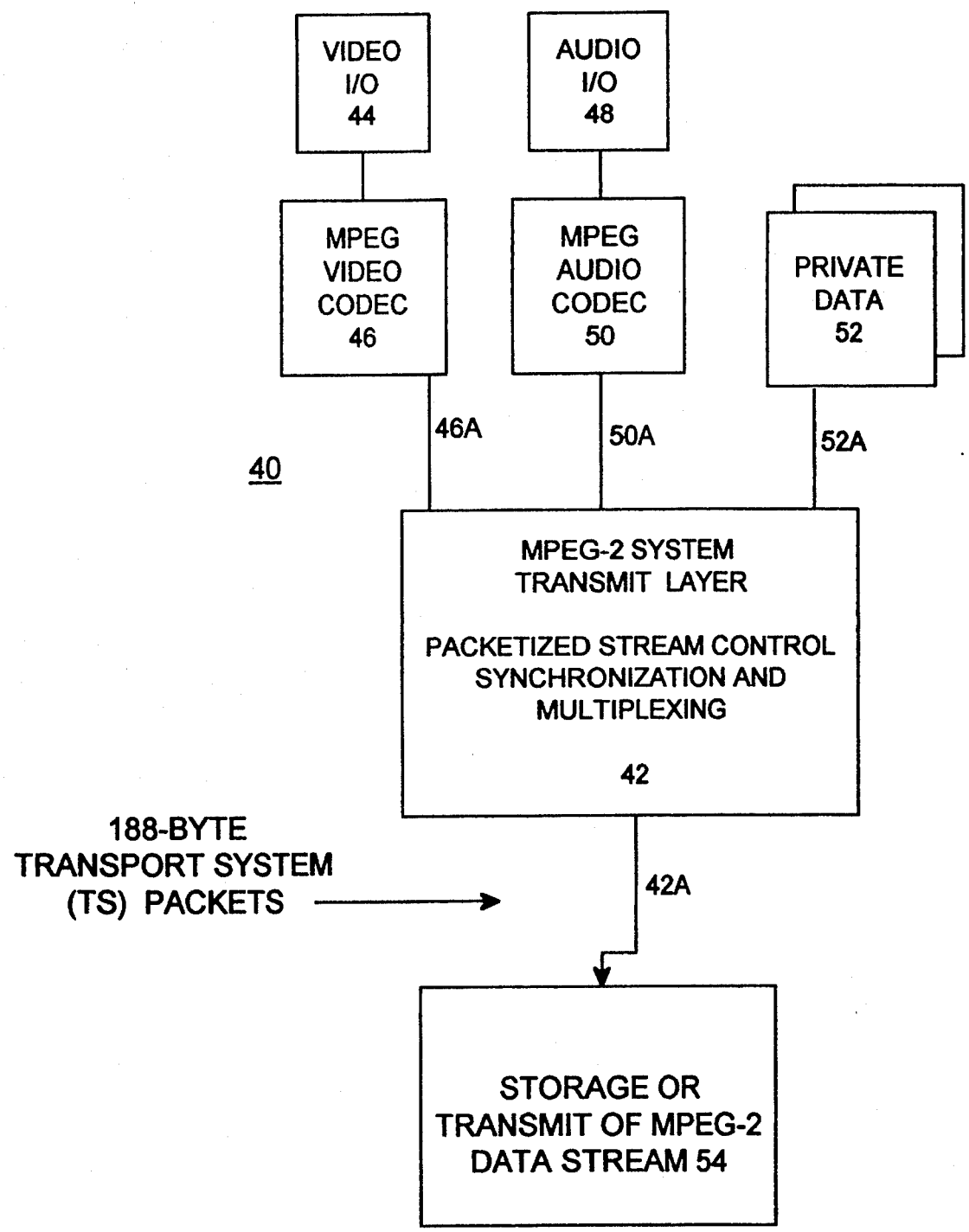
FIG. 2 is a block diagram representation illustrating multiple multimedia sources; a multimedia system layer and a multimedia transport arranged in accordance with the MPEG-2 Standard.
Figure 3:
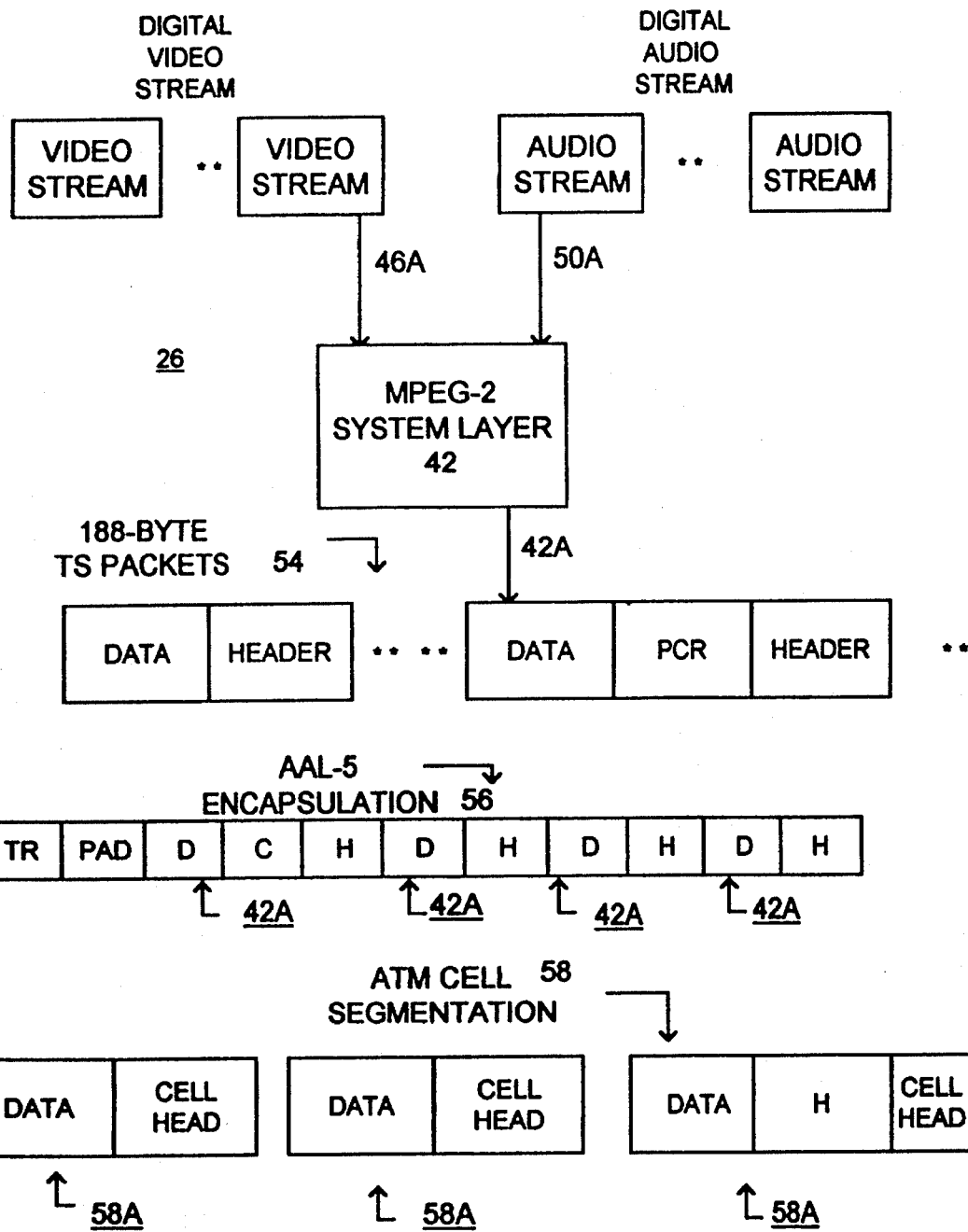
FIG. 3 is a block diagram representation illustrating generation of the MPEG-2 data stream in accordance with the present invention.

Referring to FIGS. 2 and 3, a multimedia MPEG-2 system transmit layer together with a video source 44, an MPEG-2 video coder-decoder (CODEC) 46, an audio source 48, an MPEG-2 audio CODEC 50 and a private data source 52 and a multimedia storage or transport 54 and MPEG-2 data stream generation arranged in accordance with the MPEG-2 Standard are shown. The video I/O source 44 is applied to the MPEG-2 Video (CODEC) 46 that provides a coded video digital bit stream indicated at a line 46A. The MPEG-2 Video Standard specifies the coded bit stream for high-quality digital video and that is compatible with the MPEG-1 Video Standard (ISO IEC IS 11172-2). MPEG-2 also supports interlaced video formats, increased image quality, several picture aspect ratios, including 43 and 16 and a number of other advanced features, including those needed for HDTV. MPEG-2 Video can be defined in terms of profiles, each of which will support the features needed by a different class of applications.

The audio I/O source 48 is applied to the MPEG-2 audio CODEC 50 that provides a coded audio digital bit stream indicated at a line 50A. MPEG-2 Audio Standard coding supports up to five full bandwidth channels 0, left, right, center, and two surround channels, plus an enhancement channel and/or up to seven commentary multi-lingual channels. The MPEG-2 Audio Standard also provides improved quality coding of monaural and conventional stereo signals for bit rates at or below 64 Kbits/second (Kbps).

Multimedia system transmit layer 42 performs packetized stream control, synchronization and multiplexing of the applied audio, video and private data streams. The MPEG-2 Systems Standard specifies how to combine multiple audio, video and private-data streams into a single multiplexed stream. Multimedia system transmit layer 42 is designed to support a wide range of broadcast interactive communications, computing and storage applications. MPEG-2 Systems Standard defines two kinds of streams, Program and Transport.

Typically the multimedia systems transmit layer processes the compressed video codec, audio codec and private data streams 46A, 50A, 52A in two steps. First the codec data (elementary) streams are combined with system-level information including time stamps (PCRs), program identifier, sequence numbers and an error correcting mechanism, and packetized to produce packetized elementary streams (PESs). Second the PESs are combined to form either a Program Stream or a Transport Stream. The MPEG-2 Program Stream supports the creation of a single audio-visual program which could have multiple views and multichannel audio. It utilizes variable-length packets and is designed for transmission in relatively error-free environments.

The MPEG-2 Transport Stream multiplexes a number of programs comprising video, audio and private data for transmission and storage using a wide variety of media. It performs packetized stream control and synchronization. It is designed for transmission in a busy or noisy environment and utilizes a fixed-size 188-byte packet with fixed and variable rate encoding schemes for video streams. The MPEG-2 encoding scheme allows for variable size and quality of video streams and provides a transport mechanism for other video encoding schemes, e.g., MPEG-1. The MPEG-2 Transport Stream utilizes an embedded program clock reference (PCR) which allows multiple streams to be synchronized and allows the transmitter (server 26) and the receiver (decoder/receiver 20) to run synchronously with each other.

As illustrated in FIG. 3, the MPEG-2 system transmit layer 42 integrates the multiple media sources into a single data stream 42A with integrated time stamps (PCRs). The MPEG-2 transport system (TS) stream is made up of 188-byte packets. At least one TS 188-byte packet every 100 milliseconds includes a time stamp (PCR). This time stamp is used to control the synchronization of playback of the various streams on output devices 14, 18 and 22.

The TS packets 42A are encapsulated into frames or protocol data units (PDUs) including a selected adaptation layer implementation. An AAL-5 encapsulation frame 56 concatenates a negotiated number N of TS packets 42A which are encapsulated based on the location of the PCRs in the TS packets. The selected number 1–N of MPEG-2 TS packets 42A per AAL-5 frame 56 are bundled with an overriding control that the AAL-5 frame terminates when a TS packet 42 containing a PCR is reached. In accordance with the invention, the maximum number N of MPEG-2 TS packets 42A per frame 56 is negotiated at connection setup and is not a predetermined value for all sessions.

In FIG. 3, an ATM cell segmentation layer 58 illustrates enqueued ATM cells 58A each of 48 bytes and that are transmitted over the communications network 12. Data to be transmitted can be enqueued in data blocks that are much larger than the AAL-5 frames 56. Enqueued ATM cells 58A define appropriately sized AAL-5 frames.

Three schemes that can be used to encapsulate MPEG-2 Transport Stream packets (TS Packets) into AAL-5 Protocol Data Units (PDUs) include a 5/8 Cell PCR aware scheme where either one or two TS packets are encapsulated in each ATM AAL-5 frame; a fixed N (where N is the number of TS packets 42A to be encapsulated in each ATM AAL-5 PDU) scheme and the preferred negotiated N PCR aware method of the invention.

In the first 5/8 Cell PCR aware scheme normally two MPEG-2 TS packets are encapsulated into exactly 8 ATM Cells using AAL-5. No stuffing is required. However, if the first TS packet 42A entering the AAL carries a PCR, it is immediately encapsulated into five ATM cells and forwarded. Forty-four bytes of stuffing are required.

In the second fixed N scheme, a fixed number of MPEG-2 Transport Stream packets are encapsulated into a single AAL5 PDU with the current assumption that 2 MPEG-2 TS packets per AAL5 PDU would be a lower bound on that fixed number. If a larger number of TS packets/PDU is used the transmission efficiency can be improved.

Figure 5:
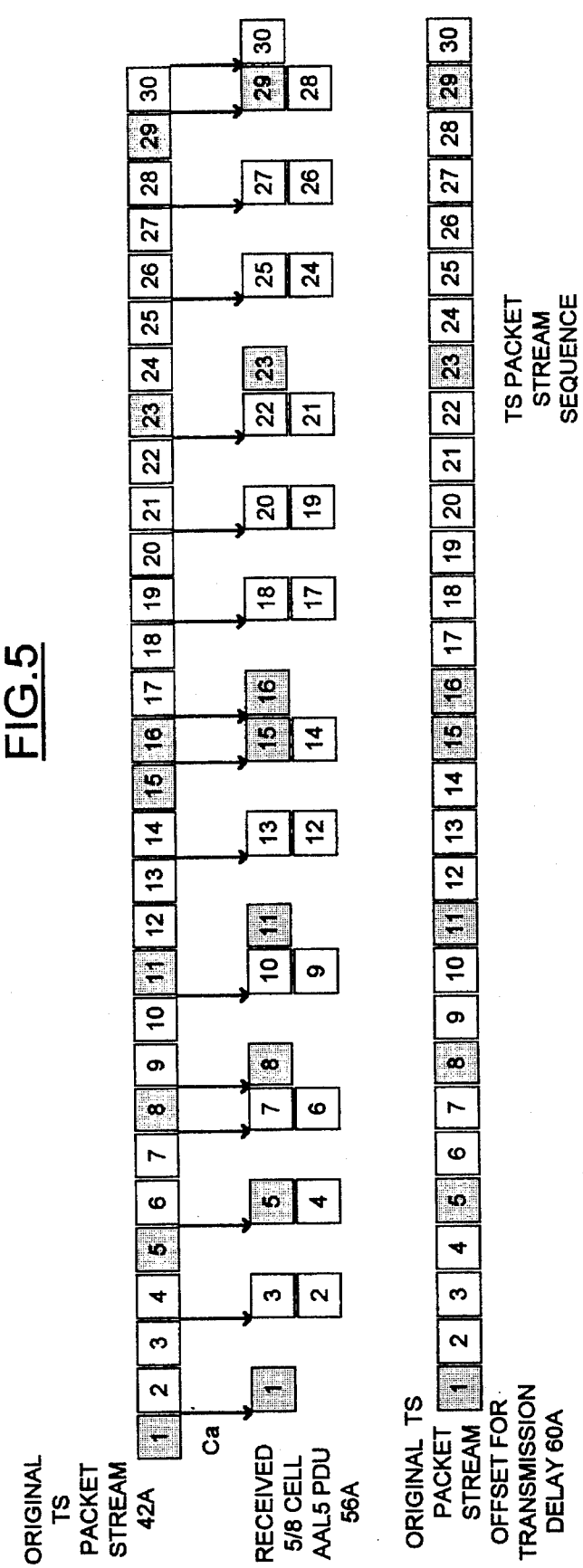
FIG. 5 is a chart illustrating transport system (TS) packet stream sequence mapped into ⅝ cell AAL-5 PDUs.
Figure 6:
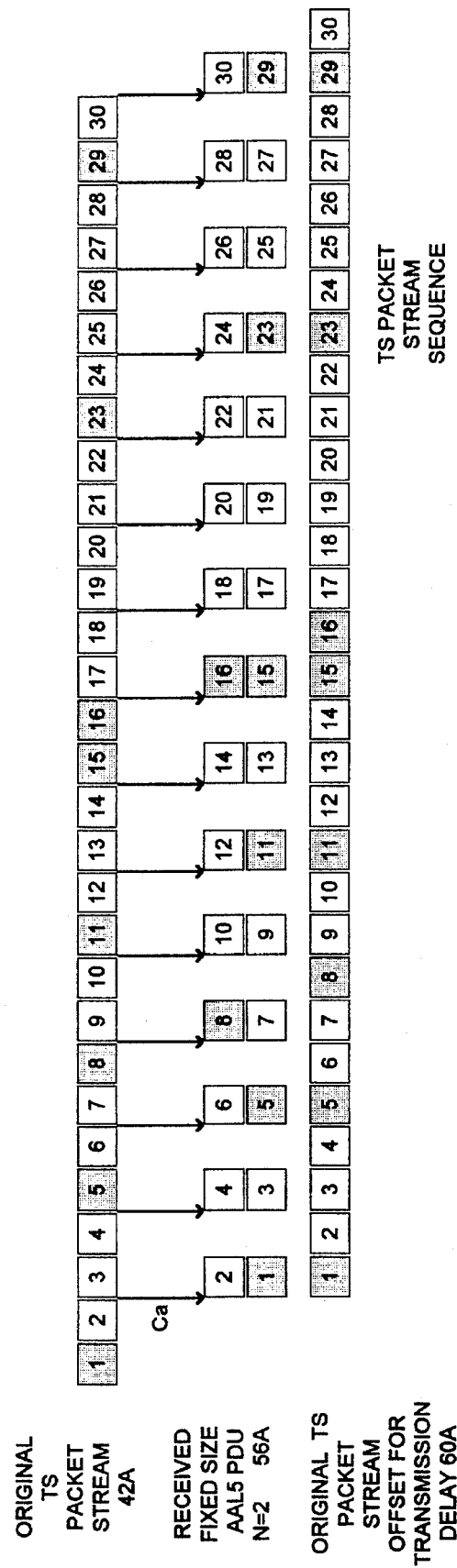
FIG. 6 is a chart illustrating transport system (TS) packet stream sequence mapped into fixed size AAL-5 Protocol Data Units (PDUs)

The AAL 5 message mode packaging jitter introduced by the two schemes for a maximum of 2 MPEG-2 TS packets/ AAL5 PDU is summarized in FIGS. 5 and 6. FIG. 5 illustrates a transport system (TS) packet stream sequence mapped into 5/8 cell AAL-5 PDUs. FIG. 6 illustrates a transport system (TS) packet stream sequence mapped into fixed size AAL-5 Protocol Data Units (PDUs). Each numbered square represents one 188 byte TS packet. The crosshatched packets signify a TS packet carrying a PCR. The absolute time varies with the data rate. At 1.5 Mbps one packet time is approximately 1 millisecond. At 6 Mbps, the packaging jitter that is introduced is 250 microseconds.

As the number of TS packets 42A/PDU is increased, the potential PCR jitter that will be introduced into the transmission of a stream grows linearly with N. The greater the jitter, the harder it is to recover an accurate clock at the receiving end. The goal in clock recovery is to discern drift between the transmitting clock and the receiving clock. With a large amount of jitter the drift will be masked.

Receive station performance constraints must also be accommodated. The 376 byte AAL5 PDU used in the previous section are rather short. For a custom designed set top 16 or other combined communication and codec subsystem implementations this is probably not a problem. For typical general purpose desktop computers 24 having separate communication and CODEC adapters that use the system bus and/or software to move information between the two subsystems, small PDU sizes represent a significant inhibitor. As an example, a 2 TS packet/AAL5 PDU stream at 6 Mbps would require 1995 (1994.68) transfers across the bus a second. Almost 2000 bus interrupts per second could not be used with most desktop computers.

To accommodate both environments, the preferred negotiated N scheme relaxed the PDU size constraint while still minimizing the packaging jitter introduced by the AAL5 message mode processing. Rather than limit the PDU size to a maximum of 2 TS packets, the negotiated N scheme allows up to N TS packets/AAL5 PDU but always send the TS packet containing the PCR as the last packet in the PDU. One to N TS packets/PDU would always be transmitted. The maximum number of TS packets allowed per PDU can be negotiated using available ATM signalling. The AAL5

Maximum PDU size used corresponding to the selected N allows dynamic adjustments to settop, desktop PC or network constraints at connect time.

The following table gives the Number of Packets between PCRs as the PCRs are inserted into the Transport stream every 100 milliseconds or every 50 milliseconds.

Number of Packets between PCRs

| Data Rate | TS Packets/s | PCR every 100 ms | PCR every 50 ms |
| --- | --- | --- | --- |
| 1 Mbps | 664.89 Pkts/s | 66.49 Pkts | 33.24 Pkts |
| 2 Mbps | 1329.78 Pkts/s | 132.98 Pkts | 66.49 Pkts |
| 3 Mbps | 1994.68 Pkts/s | 199.47 Pkts | 99.74 Pkts |
| 4 Mbps | 2659.57 Pkts/s | 265.96 Pkts | 132.98 Pkts |
| 5 Mbps | 3324.47 Pkts/s | 332.45 Pkts | 166.22 Pkts |
| 6 Mbps | 3989.36 Pkts/s | 398.74 Pkts | 199.47 Pkts |

Based on the table, the number of TS packets packaged into an AAL5 PDU could be quite large but in reality will be bounded by the loss (gap) tolerance of the CODEC; the PCR jitter accumulation caused by the processing time needed by the codec to handle the TS packets in each PDU that are in front of the packet containing the PCR; the robustness of the receive stations time base recovery capability, and the bus transfer efficiency in desktop computer. The key point is when the maximum PDU size is negotiable (not fixed by edict) these implementation and configuration specific capabilities can be traded off against one another depending on quality level and cost/performance objectives that are trying to be met.

Figure 4:
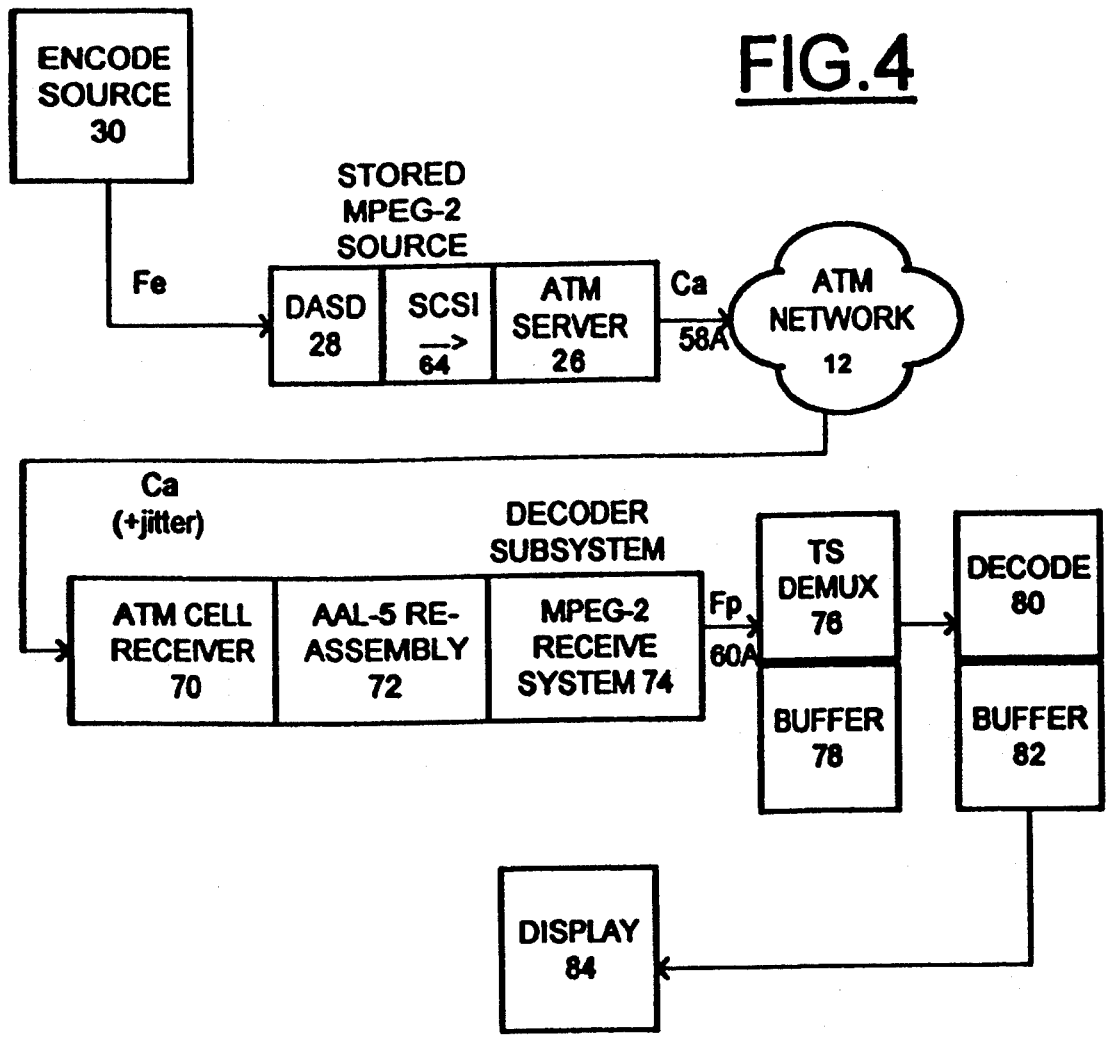
FIG. 4 is a block diagram representation illustrating a MPEG-2 system including apparatus employed for performing the method for segmenting and timing the transmission of a stream of multimedia digital data in accordance with the present invention.

FIG. 4 illustrates a MPEG-2 system 10 including the encode source 30 applying an MPEG-2 TS stream to the storage device 28, such as a direct access storage device (DASD) at a line labelled Fe. A SCSI interface 64 couples the DASD 28 to the ATM server 26, which may be utilized for performing the method for segmenting and timing the transmission of a stream of multimedia digital data in accordance with the present invention. ATM server 26 is illustrated and described with respect to FIGS. 8–13. ATM server 26 applies the ATM data stream 58A to the ATM network 12 at a line labelled Ca. The output data stream from network 12 at a line labelled Ca + (jitter) is received by the decoder subsystem 16, 20 or 24. Decoder 16, 20 or 24 is separated into an ATM cell receiver 70, an AAL-5 reassembly layer 72 and an MPEG-2 receive system layer 74. The MPEG-2 receive system layer 74 provides the decoded data stream 60A at a line Fp to a TS demuliplexor (demux) 76 including a dedicated buffer 78. A decoder 80 and a buffer 82 decodes and applies the video, audio and data to the display 14, 18 or 22.

As shown in FIG. 4 and used in the following example calculations, the terms are defined as follows:

Fe= Encode rate of the MPEG-2 stream.

M= Number of MPEG-2 Transport stream packets per AAL-5 PDU.

C=Number of ATM cells needed to contain M packets.

P=Number of padding bytes required for M packets per PDU.

OH=Overhead bytes including ATM headers (H in FIG. 3)+ Padding (PAD in FIG. 3)+ AAL-5 Trailer (TR in FIG. 3)

E=Efficiency of MPEG-2 data delivery over ATM based on M.

Tm=Time to transmit M packets at the encoded bitrate.

k=Increase in transmit frequency over encode rate to compensate for bytes of overhead (OH) in the PDU.

Ci=Ideal Cell rate into ATM network.

Fi=Ideal bitrate into ATM network.

Ca=Actual Cell rate into ATM network.

Fa=Actual bitrate into ATM network.

By adding ATM cell header bytes and specific adaptation layer overhead (header/trailer bytes and/or padding), one can derive an ideal bit rate into an ATM network. However, one must then select from the finite steps allowed by the ATM server hardware in selecting a valid rate for the data. Worst-case calculations must also consider the stability of the server clock reference (in ppm), and its associated linearity characteristics. This is additive to the worst-case difference between the encode rate of the stream and the transmit rate into the ATM network.

A single program transport stream payload is assumed for calculating the ideal push rate into the network. The specified encoded bitrate must also include any "space" set aside for ancillary services such as user data. Network jitter is considered to have a negligible long-term affect on decoder buffer management.

The ideal transmission rate for a given MPEG-2 encoded stream is achieved at the receiving end, when, after all transmission overhead bytes have been removed, the payload arrives at the encoded bitrate. For any adaptation layer implementation, the amount of overhead can be defined and used to calculate the ideal bitrate. For AAL-5, it is dependent on two factors, 1) whether or not MPEG-2 Transport Stream Packets are split across sequential PDUs, and 2) the size of the PDU.

Let us assume a push server which is implementing AAL-5, and does not split MPEG-2 packets across a PDU. One can then quickly devise formulas for calculating the number of ATM cells and the resulting overhead generated for a given number of MPEG-2 packets per PDU (in the form of ATM headers, padding, and AAL-5 trailer).

The varying number of padding bytes, along with the constant 8-byte PDU trailer and 5-byte ATM cell header compose the bytes of overhead per PDU.

By calculating the amount of overhead for a given PDU size, we can then calculate the ideal bitrate into the network which would provide the encode rate for the payload after the receive system layer 74 of the receiver. The values can be calculated with the following equations:

$$C=(M\times188)+8) \text{ divided by } 48 \text{ (Payload bytes+ AAL-5 Trailer)}/48$$
$$\text{rounded to next highest integer.}$$

$$P=(C\times48)-(M\times188)-8=Padding\ bytes.$$

$$OH=(C\times5)+P+8=Total\ overhead\ bytes\ per\ PDU.$$

In order to deliver the MPEG-2 payload at the encoded bitrate of the stream, one must first calculate the time required for the payload itself:

$$Tm=(M\times188\times8)/Fe=Time\ to\ transmit\ the\ payload.$$

To be transparent end-to-end, the overhead bytes must also be transmitted in the same amount of time. Therefore, we can calculate the additional bandwidth "k" needed to send the overhead as follows:

$$k=(OH\times8)/Tm=Overhead\ bitrate\ based\ on\ bitrate\ required\ for$$
$$encoded\ bitstreahm\ (Fe).$$

To determine the ideal cell rate into the network, the bandwidth overhead term "k" must be added to the encode bitrate (Fe) and then divided by the number of bits per ATM cell as follows:

$$Fi = Fe + k = \text{Encode bitrate} + \text{overhead} = Fe + (Fe \times OH/((M \times 188))) = \text{Ideal bit rate}$$

$$Ci = Fi/424 = \text{Ideal cell rate into ATM network to achieve encode bitrate at RCV.}$$

Since this is likely to result in an unavailable cell rate, one must select a valid cell rate provided by the ATM server hardware. This granularity can be represented by the term "Z", which represents the number of cells in each step that can be selected in the hardware, where typically $1 \leq Z < 2$.

Selection of a cell rate can be done either by rounding up to the next higher cell rate or rounding down, depending on which is closer. If the closest step results in a payload bitrate which is less than the encoded rate of the data, starvation will occur at the decoder. An initial latency may be incurred if the bitrate delta is small enough to allow an initial build-up of data queues in the TS demux 76 before starting the decoders. This initial buffering would only delay the starvation and may only be valid for very short clips which can accommodate some degree of start-up latency.

However, a cell rate which delivers the payload at a higher rate than the encoded bitstream is more desirable. Start-up latency is minimized, and cell loss or CRC errors could actually help bring the delta between the two bitrates closer together. Buffer management in the TS demux 76 requires interrogation of queue thresholds to determine what measures are to be taken to avoid overruns.

Let us assume that buffer management techniques in the decoder subsystem and a desire to minimize start-up latency will be adequate reasons to round up to the next valid cell rate available from the adapter. The cell rate step size (Z) will then determine the degree to which the ATM server 26 will over-drive the MPEG-2 payload into the network and thereby the receiver. Using this factor, one can normalize the ideal cell rate (Ci) by first dividing by Z, rounding up, and multiplying by Z to determine the next available cell rate.

$$Ca = \{Ci/Z\} \times Z \text{ Actual cell rate into ATM network is Ci normalized to the cell rate steps available in the ATM server.}$$

Worst-case rounding calculations can result in a bitrate which is almost a whole step higher than the desired bitrate. This will bound the maximum over-drive of the payload into the receiver.

Since the result of this normalization will rarely result in an integer cell rate, the requested rate into the ATM network must also be rounded to the next integer cell rate, but this does not affect the actual cell rate of the ATM server 26 as calculated above, and does not affect the payload bitrate.

At the receiving node, the overhead bytes will be stripped by the ATM cell receiver 70, AAL-5 layer 72, and the MPEG-2 system layer 74 before reaching the decoder subsystem. The actual bitrate into this system is $Fa = Ca \times 424$. The payload bitrate (Fp) can be described as follows:

$$Fp/(M \times 188 \times 8) = Fa/((M \times 188 \times 8) + (OH \times 8))$$

$$Fp = Fa \times ((M \times 188))/((M \times 188) + OH)$$

$$Fp = Fa \times E$$

$$Fx = Fp - Fe = \text{Excess MPEG-2 data rate.}$$

Figure 7:
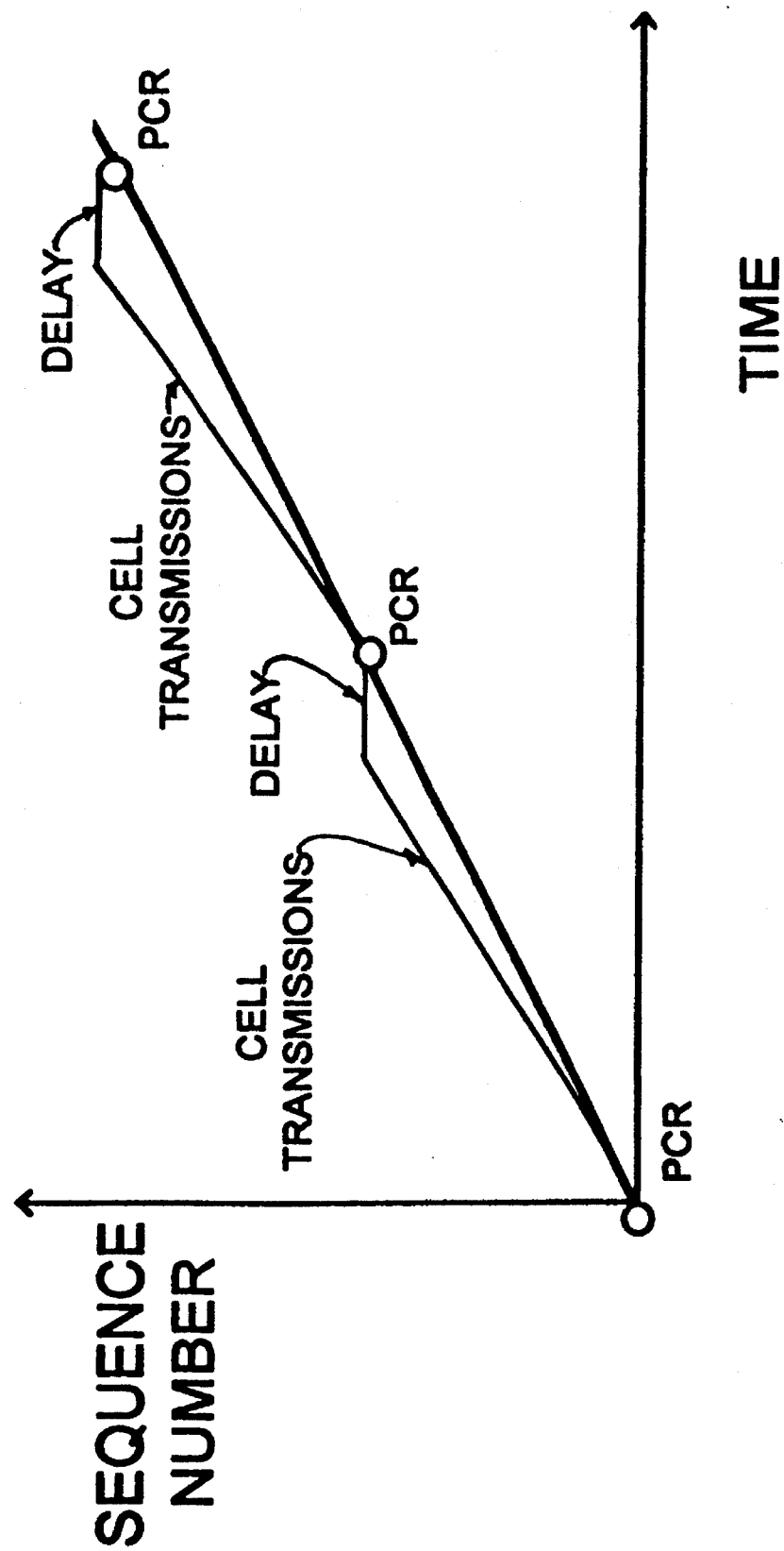
FIG. 7 is a chart illustrating the transmission timing of the MPEG-2 data stream in accordance with the present invention.

FIG. 7 provides a graphical representation of the time synchronization process for the transmission of the multimedia data of the invention. The frames containing the PCRs are transmitted right on the time they should be transmitted, regardless of the variation in transmission speed or encoding density.

Figure 8:
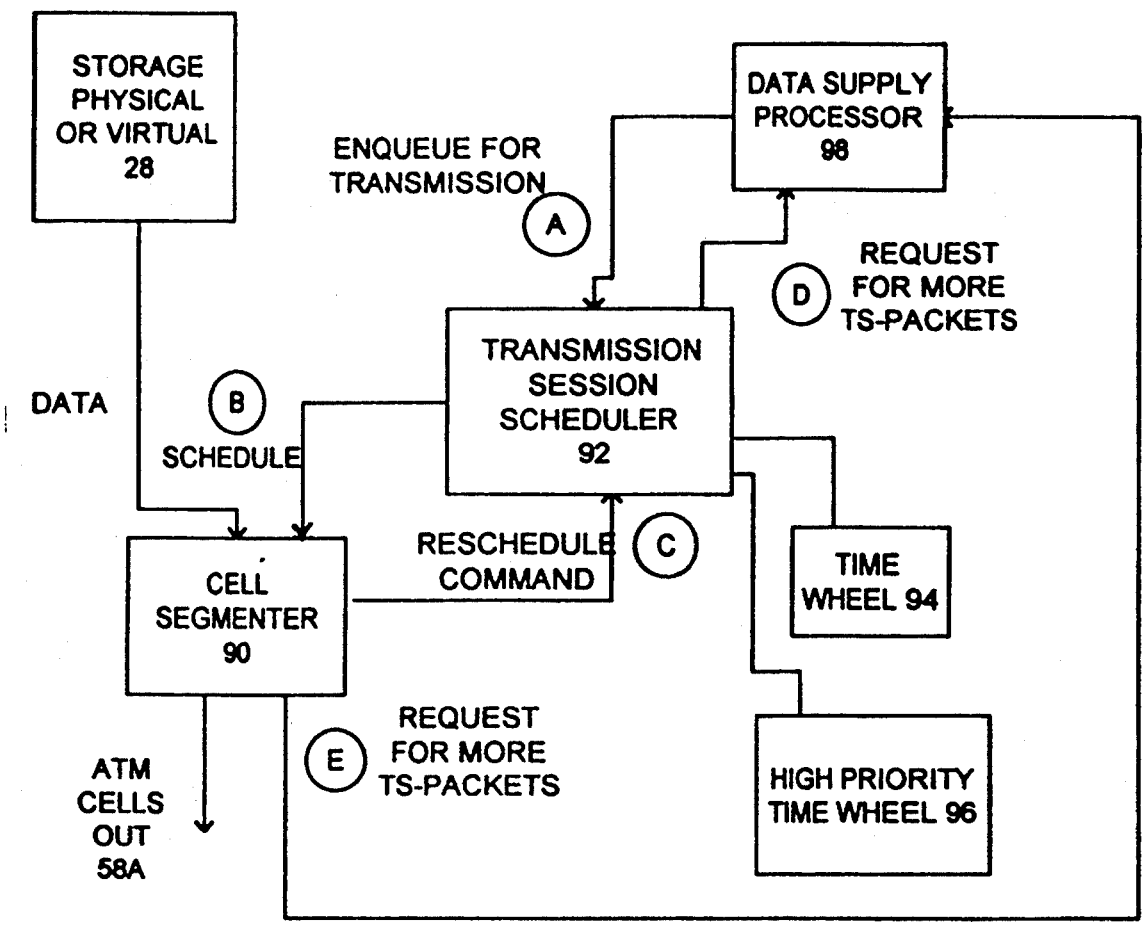
FIG. 8 is a block diagram representation of a multimedia server of the system of FIGS. 1 and 4 illustrating the apparatus of the present invention.

In FIG. 7, note that the average transmission rate is approximately 0.5% faster than the average required rate if there were no PCR caused expansion of bandwidth requirements. When a PCR is encountered, a cell transmission scheduler 92 in FIG. 8 compares the PCR with a clock which can be synchronized with the network or driven from a precise (10 PPM) crystal, and delays the transmission until just the right time of the embedded timestamp PCR. This way, the PCRs are always transmitted at just the right time to have precise matching of the receive rate that the receiver expects and the actual transmit rate. As a result of having precise and predictable rate matching, a smaller receiver buffer size than otherwise would be required can be used.

Referring now to FIG. 8, there is shown multimedia stream server 26 arranged in accordance with the invention together with a physical or virtual storage 28. Multimedia stream server 26 includes a cell segmenter 90 receiving TS packets from storage 28 and providing the ATM cells output 58A. Data can be enqueued in larger blocks and segmenter 90 takes the blocks and converts them into AAL-5 frames. This is done on two boundaries, a fixed number N of MPEG-2 TS Packets acts as a maximum size for the AAL-5 frame and checking the TS packets to terminate an AAL-5 frame at the end of any TS packet that includes a PCR (timestamp). Multimedia stream server 26 includes a transmission session scheduler 92, an associated time wheel 94 and an optional high priority time wheel 96 and a data supply processor 98.

So that the processor 98 does not have to keep time on all of its streams, the segmentation process can be augmented so that on arbitrary data boundaries the process will receive a request for more data. This notification feature is included as part of the scheduling or data segmentation process. The delay feature of the invention is used to exactly match the transmission of data to the embedded PCR timestamps to transmit the non-PCR TS packets at a slightly higher rate than is predicted by the data-rate of the source, and when a PCR is detected, the transmission of the TS packet containing the PCR is delayed until the time indicated by the PCR is reached. There are a number of ways to achieve this result considering tradeoffs between complexity, accuracy and efficiency that may be understood as follows.

First when a TS packet with a PCR is detected by the segmenter 90, the segmenter compares the PCR with the timer base. If the time has passed, the segmenter transmits the cell, if the time has not passed, the segmenter simply sends nothing and reconsiders the next time that stream is presented for segmentation.

Second the segmenter 90 can do the same transmission delay as above, but on the last cell of a TS packet rather than the first. This increases the amount of state storage required by the segmenter 90, but will greatly increase the accuracy of the PCR times.

Third the segmenter 90 can ask the scheduler 92 to defer scheduling of the stream until the time indicated by the PCR. This requires a rescheduling interface as indicated at a line labelled RESCHEDULE COMMAND C between the segmenter 90 and the scheduler 92; however, the memory utilization efficiency is increased.

Fourth, if the rescheduling is done, the scheduler 92 can reschedule to the higher priority time wheel 96 for just the PCR sensitive cell. This will increase the transmission accuracy when multiple streams are being transmitted over multiple computer stations 24.

The multimedia stream server 26 can be implemented using CMOS technology on a VLSI chip and support data rates up to 622 Mbps.

Figure 9:
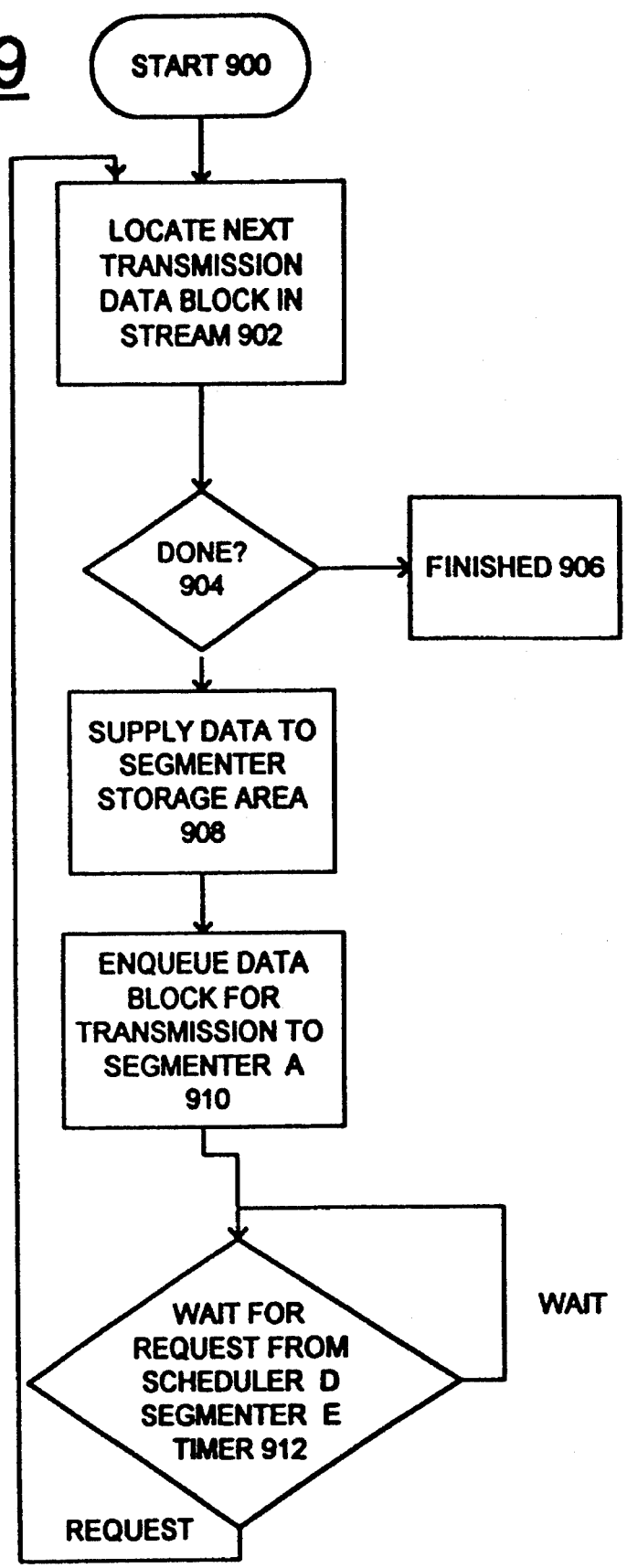
FIG. 9 is a flow chart illustrating a data supply process of the present invention performed by a data supply processor of FIG. 8.

Referring to FIG. 9, there are shown sequential steps for data supply processing performed by the data supply processor 98 of the present invention that begin at a block 900. A next transmission data block is located in storage as indicated at a block 902. Then it is determined if the process has been completed by checking for more transmission data is available as indicated at a block 904. If more transmission data is not available, then the sequential operations are completed as indicated at a block 906. Otherwise, the located next block of transmission data is supplied to the segmenter storage area as indicated at a block 908. Then data supply processor 98 applies an enqueued for transmission command to the scheduler 92 as indicated at a block 910. Then the data supply processor 98 waits for a request for more transport system data packets from the scheduler 92 at line D or the segmenter 90 at line E as indicated at a block 912. When a request is identified at block 912, then the sequential steps are repeated.

Figure 10:
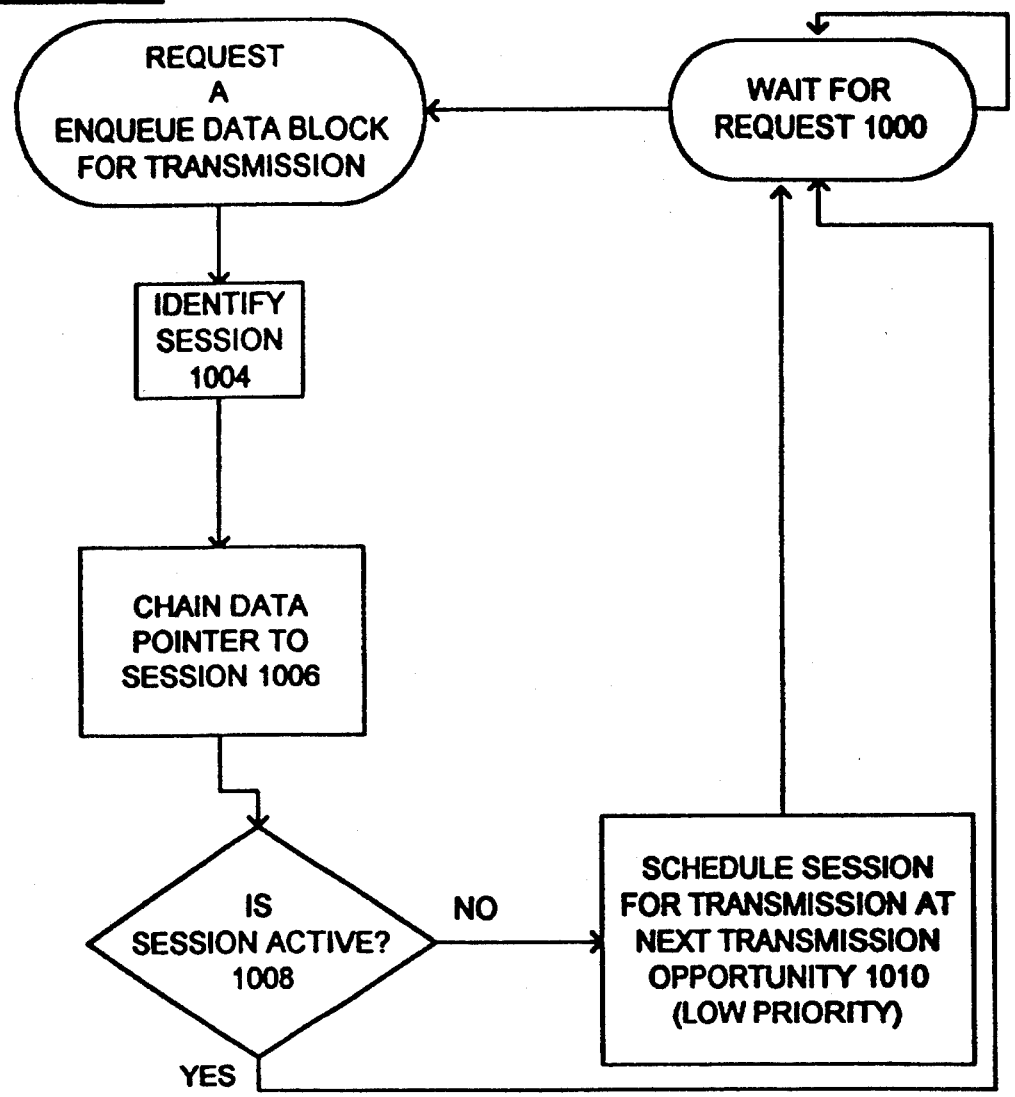
FIGS. 10, 11 and 12 are flow charts illustrating scheduler processes performed by a transmission session scheduler of FIG. 8.
Figure 11:
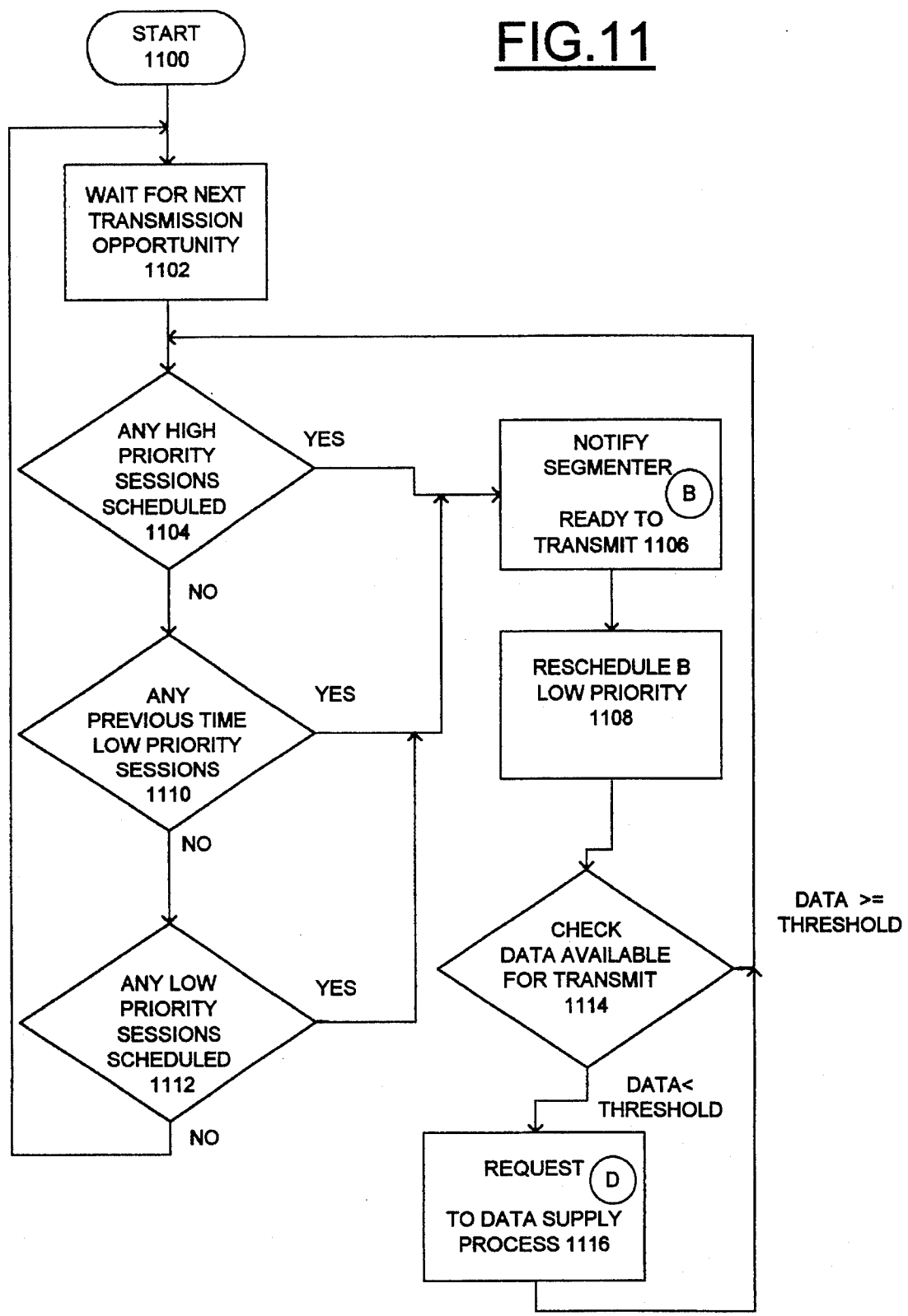
Figure 12:
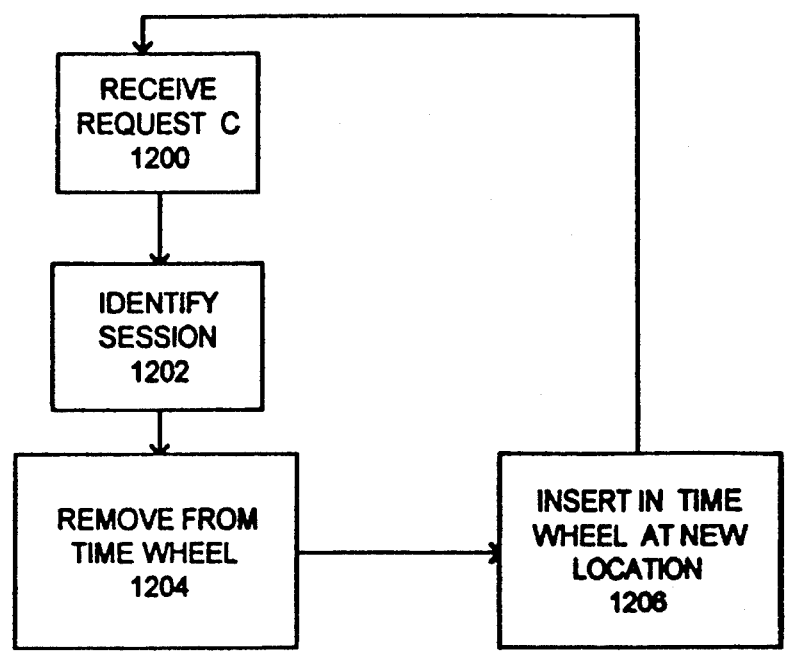

FIGS. 10, 11 and 12 are flow charts illustrating scheduler processes performed by a transmission session scheduler 92. In FIG. 10, the scheduler processes start with waiting for a data supply request as indicated at a block 1000. Scheduler 92 receives a request to enqueue data block for transmission from the data supply processor as indicated at a block 1002. Then a session is identified at a block 1004 and a data block pointer is chained to the session as indicated at a block 1006. Next it determined if the session is active as indicated at a decision block 1008. If an active session is identified at block 1008, then the sequential operations return to block 1000 to wait for request. Otherwise, if an active session is not identified at block 1008, then the session identified at block 1004 is scheduled for transmission at a next transmission opportunity as indicated at a block 1108. Then the sequential operations return to block 1000 to wait for a request.

Referring to FIG. 11, sequential steps for data transmission scheduling performed by the transmission session scheduler 92 begin at a block 1100. Then scheduler 92 waits for a next transmission opportunity as indicated at a block 1102. Next scheduler 92 checks for any high priority sessions scheduled as indicated at a decision block 1104. When a scheduled high priority session is identified at block 1104, then the session is labelled and scheduler 92 provides segmenter 90 with a ready to transmit command at line B as indicated at a block 1106. Then scheduler 92 reschedules at B to low priority as indicated at a block 1108 and returns to block 1102. When a high priority session is not identified at block 1104, scheduler 92 checks for any previous time low priority sessions waiting for transmission as indicated at a decision block 1110. If found, the session is labelled and scheduler 92 provides segmenter 90 with a ready to transmit command at line B at block 1006 and the sequential operations are repeated as before. Otherwise, if no low priority sessions waiting for transmission are identified at block 1100, then scheduler 92 checks for any low priority sessions scheduled as indicated at a decision block 1112. An identified scheduled low priority sessions is labelled and the sequential operations are repeated. Checking for data available for transmit is provided at a decision block 1114. When the data available for transmit is greater than or equal to a predetermined threshold, then the sequential operations continue returning to block 1104. When the data available for transmit is less than a predetermined threshold, then a request for more TS-packets is applied to the data supply processor 98 at line D as indicated at a block 1116. Then the sequential operations continue returning to block 1104.

Referring to FIG. 12, sequential steps for data transmission rescheduling performed by the transmission session scheduler 92 begin with receiving a reschedule request from the segmenter 90 at line C as indicated at a block 1200. Then a session is identified at a block 1202 and removed the time wheel as indicated at a block 1204. Then the session is inserted in the time wheel 94 at a new location.

Figure 13:
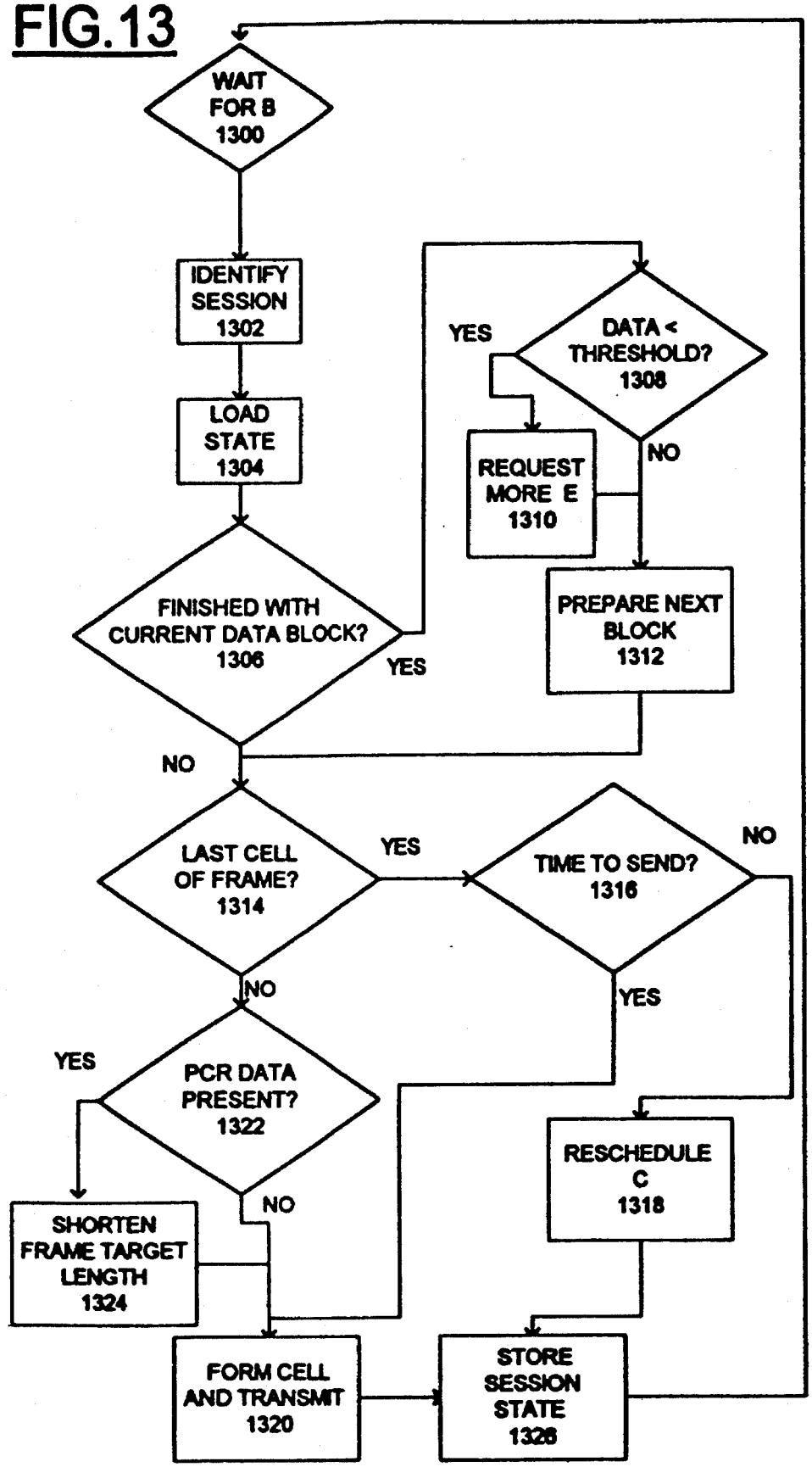
FIG. 13 is a flow chart illustrating cell segmentation method of the present invention performed by a cell segmenter of FIG. 8.

Referring to FIG. 13, there are shown sequential steps for data segmentation performed by the cell segmenter 90 of the present invention that begin at a block 1300 with waiting for a schedule request from scheduler 92. Then a session is identified at a block 1302 and the session state data is loaded as indicated at a block 1304. Segmenter 90 checks whether the current data block is finished at a decision block 1306. If the current data block is finished, then segmenter 90 checks if the data is less than a threshold value as indicated at a decision block 1308. If so, then more data is requested (line E in FIG. 8) as indicated at a block 1310. Then the next data block is prepared as indicated at a block 1312. Then segmenter 90 checks whether the current cell is last cell in a data frame at a decision block 1314. When the last cell of the frame is identified at block 1314, then segmenter 90 checks if time to send at a decision block 1316. If not the time to send, then a reschedule request at line C is applied to the scheduler 92 as indicated at a block 1318. If the time to send, then segmenter forms the cell and transmits as indicated at a block 1320. Otherwise, if the current cell is not the last cell in a data frame, then the cell is checked to locate a PCR timestamp as indicated at a block 1322. When a PCR is present, then segmenter 92 shortens the frame target length as indicated at a block 1324. Then and when a PCR is not identified at decision block 1322, segmenter forms the cell and transmits at block 1320. Next segmenter stores the session state as indicated at a block 1326.

In accordance with a feature of the invention, frames received by decoder/receiver 20 and computer station 24 advantageously can be put into a queue that will interrupt the processor only after a given number of frames have arrived or after a given time period has elapsed from the receipt of the first frame. This allows the receiving code to batch the receive processing.

Figure 14:
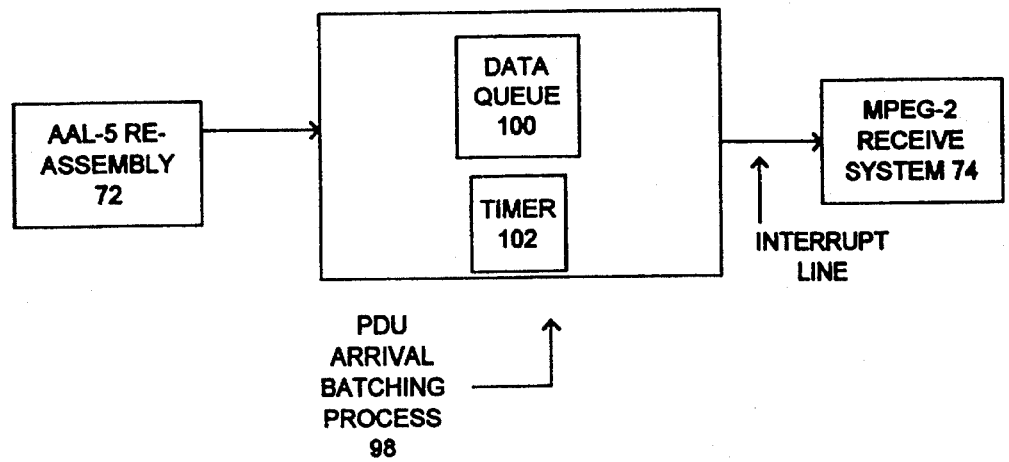
FIG. 14 is a block diagram representation of a multimedia receiver of the system of FIGS. 1 and 4 illustrating the apparatus of the present invention.

FIG. 14 illustrates details of the decoder 20 or 24 used for the batch processing feature of the invention. Decoder 20, 24 includes a PDU arrival batch processing block 98 providing a data queue function 100 and timer function 102. The PDU arrival batch process is used to reduce the number of interrupts that the MPEG-2 TS receive packet system layer 76 must process. The AAL-5 reassembly layer 74 queues the AAL-5 frames on arrival.

Figure 15:
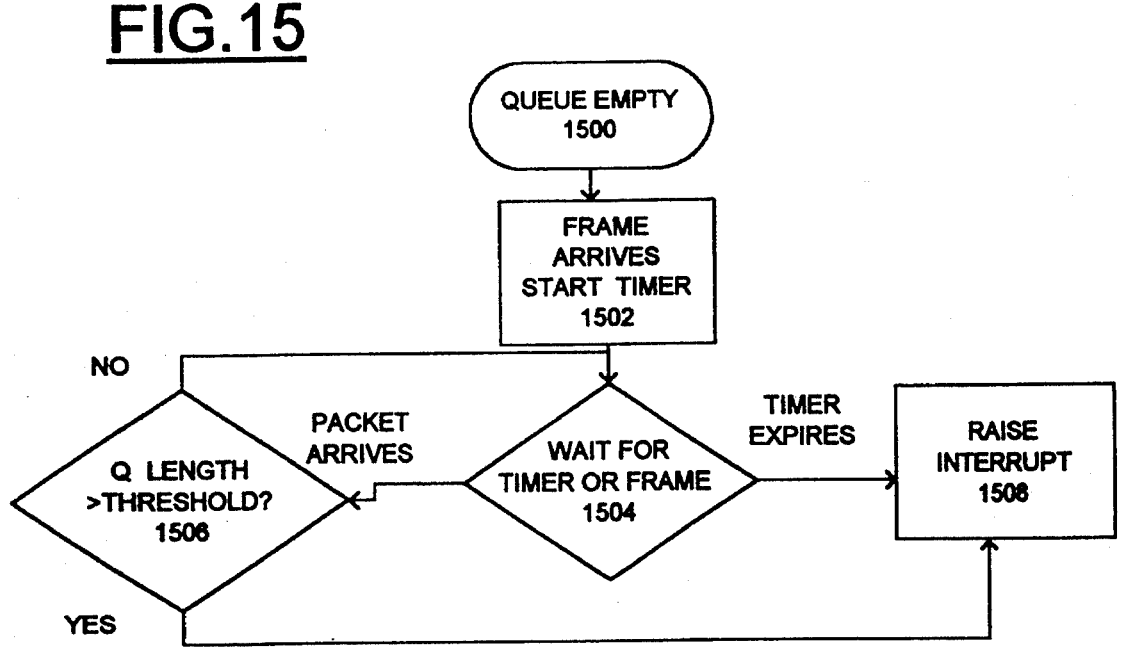
FIG. 15 is a flow chart illustrating a protocol data unit arrival batch process of the present invention.

Referring also to FIG. 15, sequential steps of the batch processing are shown. If the queue is initially empty as indicated at a block 1500, then the timer 102 is set when a frame arrives as indicated at block 1502. As additional frames arrive, the reassembly layer 74 checks to see if the number of frames in the queue is greater than the threshold for this connection as indicated at a block 1506. When either the timer expires as indicated at a block 1504 or the threshold is crossed, then the reassembly layer raises an interrupt to the MPEG-2 TS receive packet system layer 74 as indicated at a block 1508. When a frame is removed from the queue, the timer function is stopped and reset. When a subsequent frame arrives, the timer 102 is restarted and the batch processing is repeated.

It should be noted that the present invention can be used with other time encoding protocols, and the stream being transmitted can be encoded at variable rate as well as fixed rate.

While the present invention has been described with reference to the details of the embodiments of the invention shown in the drawing, these details are not intended to limit the scope of the invention as claimed in the appended claims.

What is claimed is:

1. A method for segmenting a multimedia data stream for transmission over a distribution communications network, said multimedia data stream including sequential transport system (TS) packets with program clock references (PCRs) at a selected time interval, said method comprising the steps of:

receiving the multimedia digital data stream;

decoding said TS packets to identify the program clock references (PCRs);

identifying a selected number N of TS packets;

encapsulating said multimedia digital data stream into frames responsive to both said identified selected number N of TS packets and said identified PCR; and identifying said selected number N at a connection setup for the multimedia data stream.

2. A method for segmenting a multimedia data stream for transmission over a distribution communications network, said multimedia data stream including sequential transport system (TS) packets with program clock references (PCRs) at a selected time interval, said method comprising the steps of:

receiving the multimedia digital data stream;

decoding said TS packets to identify the program clock references (PCRs);

identifying a selected number N of TS packets;

encapsulating said multimedia digital data stream into frames responsive to both said identified selected number N of TS packets and said identified PCR; and wherein said step of encapsulating said multimedia digital data stream into frames responsive to both said identified selected number N of TS packets and said identified PCR provides sequential multimedia digital data stream frames, each frame including one to said selected number N of TS packets and wherein an identified TS packet containing said identified PCR is the last packet in said frame.

3. A method for segmenting a multimedia data stream as recited in claim 1 wherein said step of encapsulating said multimedia digital data stream into frames responsive to both said identified selected number N of TS packets and said identified PCR includes the step of transforming said multimedia digital data stream TS packets directly into fixed size Asynchronous Transfer Mode (ATM) cells; said ATM cells being transmitted over the distribution communications network and being reassembled into said multimedia digital data stream frames by a decoder/receiver coupled to the network.

4. Apparatus for segmenting a multimedia data stream for transmission over a distribution communications network, said multimedia data stream including sequential transport system (TS) packets with embedded program clock references (PCRs) at a selected time interval, comprising:

means for receiving the multimedia digital data stream;

means for decoding said TS packets to identify the program clock references (PCRs);

means for identifying a selected number N of TS packets;

means for encapsulating said multimedia digital data stream into frames responsive to both said identified selected number N of TS packets and said identified PCR; and data supply processor means for supplying the multimedia digital data stream to said receiving means and notification means for requesting data from said data supply processor means.

5. Apparatus for segmenting a multimedia data stream as recited in claim 4 wherein said means for encapsulating said multimedia digital data stream into frames responsive to both said identified selected number N of TS packets and said identified PCR includes means for transforming said multimedia digital data stream TS packets directly into fixed size Asynchronous Transfer Mode (ATM) cells; said ATM cells being transmitted over the distribution communications network and being reassembled into said multimedia digital data stream frames by a decoder/receiver coupled to the network.

* * * * *